J. P. PEDERSEN.
HUB FASTENER.
APPLICATION FILED DEC. 16, 1913.
1,134,003.
Patented Mar. 30, 1915.
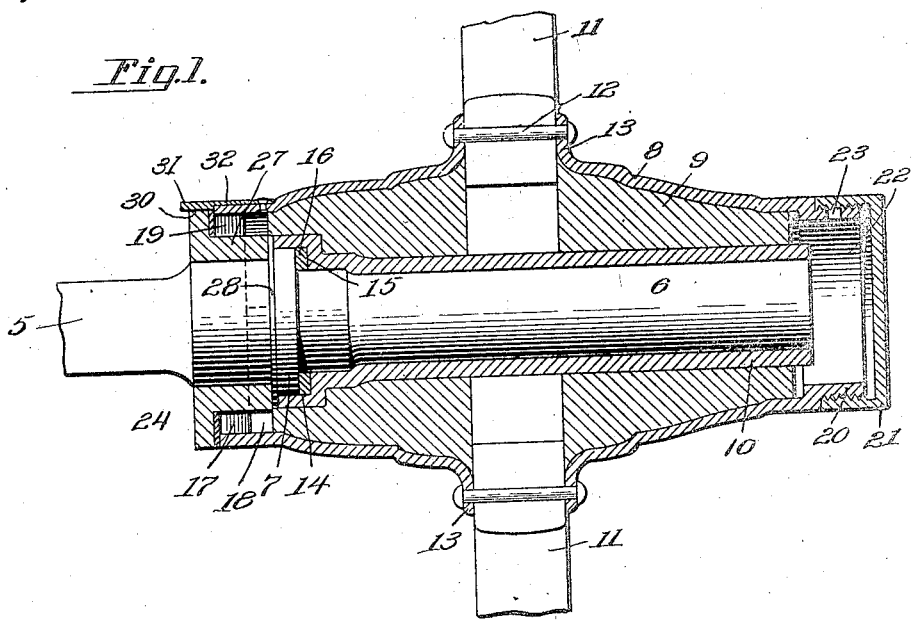
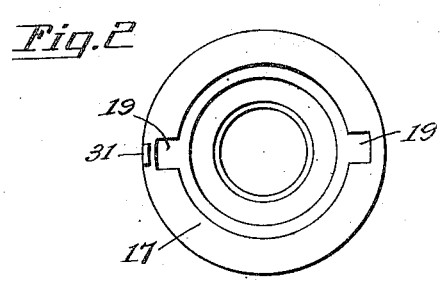
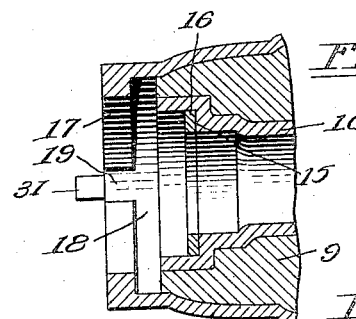
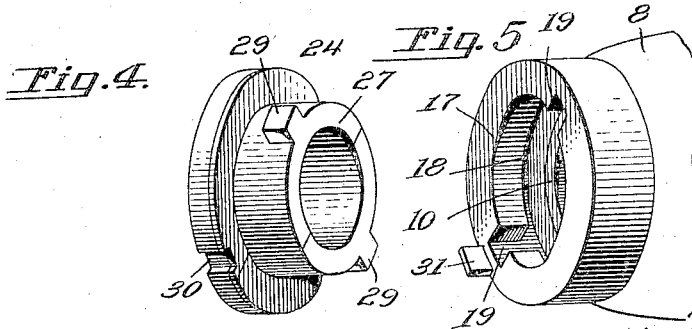
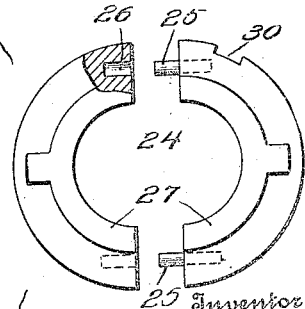
Inventor
Jens P. Pedersen.
Witnesses
F. C. Gibson
F. O. ...
By Victor J. Evans
Attorney

UNITED STATES PATENT OFFICE.

JENS PETER PEDERSEN, OF PROVO, UTAH.

HUB-FASTENER.

1,134,003.  Specification of Letters Patent.  Patented Mar. 30, 1915.

Application filed December 16, 1913.   Serial No. 807,076.

*To all whom it may concern:*

Be it known that I, JENS PETER PEDERSEN, a citizen of the United States, residing at Provo, in the county of Utah and State of Utah, have invented new and useful Improvements in Hub-Fasteners, of which the following is a specification.

The invention relates to hub fasteners, and more particularly to the class of hub attaching devices.

The primary object of the invention is the provision of a hub attaching device wherein the hub will be securely mounted upon a spindle so that the hub will freely rotate thereon without any possibility of the same accidentally working off of the spindle during the travel of the vehicle.

Another object of the invention is the provision of a hub attaching device wherein the same is mounted in the rear end of the hub and is engaged about the spindle for the detachable connection of the hub thereon in a ready and convenient manner.

A further object of the invention is the provision of a hub attaching device which is extremely simple in construction, reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a fragmentary vertical longitudinal sectional view through a hub mounted upon a spindle, showing the hub attaching device constructed in accordance with the invention applied. Fig. 2 is an inner end elevation of the hub. Fig. 3 is a fragmentary vertical longitudinal sectional view of the hub removed from the spindle with the attaching device also removed therefrom. Fig. 4 is a perspective view of the hub attaching device removed from the hub. Fig. 5 is a fragmentary perspective view of the inner end of the hub. Fig. 6 is a plan view of the hub attaching device with its parts separated, one of the parts being partly in section.

Similar reference characters indicate corresponding parts throughout the several views in the drawing.

Referring to the drawing by numerals, 5 designates a portion of a vehicle axle which may be of any ordinary well-known construction, and has integrally formed therewith a spindle 6 which is formed at its inner end with an annular abutment flange or shoulder 7 against which works the wheel hub hereinafter fully described.

The wheel hub comprises a two-part outer shell or casing 8 preferably made from metal, an inner body 9, preferably made from wood, and a boxing or axle skein 10 which fits over the spindle 6 and is fixed within the body 9 in any suitable manner. Fitted in the hub are spokes 11 which have their inner ends engaged in sockets suitably formed in the body 9, the spokes being located between the two parts of the shell or casing 8 which are fastened together in this instance through the medium of bolt members 12, each being passed through the respective spokes and also through out-turned flanges 13 formed on the parts of the shell 8, the parts of the shell being extended beyond the respective ends of the body 9 of the hub. The inner end of the boxing 10 is enlarged and formed with a counter-seat or recess 14 correspondingly shaped to the flange or shoulder 7 and is adapted to receive the same, and likewise the inner end of the body 9 is formed with a counter-seat 15 correspondingly shaped to and adapted to receive the enlarged end of the boxing 10 to accommodate the same. Arranged within the counter-seat or recess 14 in the boxing 10 and encircling the spindle 6 is a washer 16 which works against the face adjacent thereto of the flange or shoulder 7 and serves to take up any wear during the rotation of the hub.

Formed internally at the extreme end of the inner part of the shell 8 is a ring 17 which is integral therewith and provides a lug engaging groove 18 between the same and the inner end of the body 9 within the hub, the ring 17 at diametrically opposite points being formed with notches 19 for the locking engagement of the hub attaching device therewith. The outer part of the shell 8 at its extended end is formed with a reduced externally threaded portion 20 on which is engaged a removable cap 21, the said extended end of the outer part of the shell 8 being designed to form an oil chamber 22 which is adapted to be filled with oil through a hole 23 provided in the said extended end, and this cap 21 when applied closes the chamber 22 and also closes the hole 23 to retain the oil within the chamber 22 which is utilized for lubricating the spindle 6 and boxing 10 of the hub.

Surrounding the axle 5 inwardly of the flange or shoulder 7 at the inner end of the spindle 6 is a two-part collar 24, one part of which is formed with lugs 25, while the other part is formed with sockets 26 adapted to receive the said lugs 25 so that the two parts of the collar 24 can be locked together when surrounding the said axle 5, the collar being formed with a reduced sleeve portion 27 adapted to project through the ring 17 into the inner end of the hub to abut against a washer 28 arranged between the latter and the inner face of the flange or shoulder 7, and this sleeve 27 is formed at diametrically opposite points with locking lugs 29 which are adapted to pass through the notches 19 in the collar 17 for engagement in the groove 18 on the turning of the collar 24 for the locking of the same to the inner part of the shell of the hub so that the latter will be rotatably fastened on the spindle.

In the outer periphery of the collar 24 is formed a notch 30 in which engages the catch end 31 of a leaf spring 32 fixed exteriorly to the free end of the inner part of the shell 8 of the hub so as to lock the collar fast therein, thus obviating any possibility of the accidental working loose of the collar from the hub during the rotation thereof on the spindle.

From the foregoing it is thought that the construction and manner of operation of the device will be clearly understood, and therefore a more extended explanation has been omitted.

What is claimed is:—

The combination with an axle having a collar projecting therefrom, of a hub rotatable upon the axle and having an outer sleeve-like shell formed with an end projected beyond the inner end of the hub, a diametrically notched flange internally of the said projected end of the shell and spaced from the inner end of the hub, a collar loosely surrounding the axle and having a boss for insertion within the projected end of the shell whereby the flange thereon will be concentrically disposed about the same, lugs formed on the boss at diametrically opposite points thereof and movable through the notches in the said flange for slidable engagement between the flange and the inner end of the hub whereby the collar will be locked to the latter, the said collar being formed with a notch in its outer periphery, and a leaf spring fixed to and inset in the outer face of the projected end of the shell and directed longitudinally of the hub for locking engagement in the notch in the outer periphery of the collar.

In testimony whereof I affix my signature in presence of two witnesses.

JENS PETER PEDERSEN.

Witnesses:
E. EDMONSTON, Jr.
F. O. PARKER.